United States Patent [19]

Amein et al.

[11] Patent Number: 4,736,269

[45] Date of Patent: Apr. 5, 1988

[54] VOLTAGE SURGE LIMITER WITH GROUNDING ASSEMBLY

[75] Inventors: John M. Amein, Duluth; Floyd J. Garner, Snellville; E. Walton Horne, III, Decatur; Raymond A. Levandoski, Doraville; Charles McGonigal, Grayson; Robert L. Sweatt, Tucker, all of Ga.

[73] Assignee: American Telephone and Telegraph Company, AT&T Technologies, Inc., Berkeley Heights, N.J.

[21] Appl. No.: 943,971

[22] Filed: Dec. 19, 1986

[51] Int. Cl.[4] .......................... H02H 9/06; H02H 9/02

[52] U.S. Cl. .................................... 361/128; 361/120; 361/124; 361/119; 361/130; 337/28; 337/32

[58] Field of Search ............... 361/117, 118, 119, 124, 361/126, 127, 128, 130, 120; 337/28, 29, 32

[56] References Cited

U.S. PATENT DOCUMENTS

| | | | |
|---|---|---|---|
| Re. 30,724 | 8/1981 | Klayum et al. | 361/124 |
| 3,573,695 | 4/1971 | Geyer et al. | 337/29 |
| 3,755,715 | 8/1973 | Klayum et al. | 361/124 |
| 4,158,869 | 6/1979 | Gilberts | 361/118 |
| 4,215,381 | 7/1980 | Heisinger | 361/124 |
| 4,241,374 | 12/1980 | Gilberts | 361/124 |
| 4,307,430 | 12/1981 | Montalto et al. | 361/119 |
| 4,320,435 | 3/1982 | Jones | 361/119 |
| 4,327,393 | 4/1982 | Hines et al. | 361/119 |
| 4,366,412 | 12/1982 | Lange et al. | 313/325 |
| 4,396,969 | 8/1983 | Fasano | 361/124 |
| 4,402,031 | 8/1983 | Fasano | 361/124 |
| 4,405,967 | 9/1983 | Cwirzen | 361/124 |
| 4,458,288 | 7/1984 | Chapman, Jr. et al. | 361/124 |
| 4,463,403 | 7/1984 | Fasano | 361/124 |
| 4,502,087 | 2/1985 | Huvet | 361/119 |
| 4,573,100 | 2/1986 | Fasano | 361/119 |

*Primary Examiner*—A. D. Pellinen
*Assistant Examiner*—H. L. Williams
*Attorney, Agent, or Firm*—Edward Somers

[57] ABSTRACT

A protector module (30) for protecting the conductors of a telephone loop includes a pair of protector assemblies (40-40') which are supported within a common housing (32). A gas tube voltage protection subassembly (42) of each protector assembly is connected electrically to a grounding subassembly (44) for causing current associated with excessive voltage surges to be conducted to ground. A first electrode includes a portion which extends through annular dielectric and metallic members and an opening of an open-ended metallic container (93) to engage a shunting element (62) of a current protection subassembly (41). The superimposed annular members are held in engagement with the first electrode at a substantially constant pressure by axial forces applied by turned-in portions (109—109) of a side wall of the metallic container. The shunting element is supported at one end of the line pin in an initial position by a fusible material. A spring (43) between the container of the voltage protection subassembly and the housing maintains the voltage protection subassembly in engagement with the shunting element. When current flow exceeds a predetermined level that is sufficient to melt the fusible material, the spring is effective to cause the shunting element to be moved to engage the grounding subassembly to establish a fault current path to ground. The excess voltage arcs across the wide gap to ground, or in the event that a gas in the gap has vented, the voltage arcs across openings in the dielectric member to ground in a fail-safe mode.

21 Claims, 4 Drawing Sheets

VOLTAGE SURGE LIMITER WITH GROUNDING ASSEMBLY

TECHNICAL FIELD

This invention relates to electrical protective devices. More particularly, it relates to a protector which includes wide gap type gas tube voltage surge limiter and which protects communications circuits against excessive voltage surges and excessive currents.

BACKGROUND OF THE INVENTION

In telephone engineering, it is usual practice to provide protectors at central offices for each incoming line. These protectors, which may be termed modules, combine protection against excessive voltages resulting from lightning, for example, with protection against sneak currents. Sneak currents are not strong enough to do any damage if they flow briefly, but may generate enough heat to char conductor insulation and do other damage if allowed to persist. The sneak currents are produced by voltages of relatively low magnitude as compared to the excessive voltages mentioned hereinabove and usually result from accidental interference between telephone lines and adjacent power lines.

Protection of a telephone line against excessive voltage is usually provided by a so called spark-gap protector which generally includes a pair of spaced carbon electrodes or electrodes of a gaseous discharge tube. One of the electrodes is usually connected to ground and the other to the incoming telephone line. Should a high voltage be impressed on the line, it will bridge the gap between the electrodes and cause current to flow to ground, thus bypassing sensitive equipment which is associated with the line.

The second type of protection is commonly provided by a device that is referred to as a heat coil. The heat coil includes insulated high resistance wire which is wound on a metal sleeve inside of which a contact pin is held in a predetermined position by a fusible bonding material such as solder, for example. Should excessive currents occur on the line and persist, sufficient heat will be generated by the wire to melt the solder and release the pin. A spring is usually provided to urge the released pin into electrical contact with a source of ground potential to ground the line.

Inasmuch as a ring conductor and a tip conductor are associated with each telephone station apparatus, each telephone line requires two protector assemblies. A telephone circuit protector module shown in J. B. Geyer et al U.S. Pat. No. 3,573,695 which issued on Apr. 6, 1971, includes two protector assemblies enclosed in a single insulative housing. Spark-gap and heat coil subassemblies therein are held in abutting aligned relation by a single spring which is part of the normal transmission circuit. The spring also serves to propel a pin of the heat coil subassembly into engagement with a grounding circuit, which includes one of two carbon blocks, during the passage of excessive currents through the heat coil. The extension of a contact pin through voltage protection portions of the protector precludes the use of gaseous discharge devices in place of carbon blocks. Gaseous discharge devices, which are commonly referred to as gas tubes, are desirable because of their longer lives and because they afford better control of the breakdown voltage.

In a protector module shown in U.S. Pat. No. 4,215,381 which issued on July 29, 1980 to R. F. Heisinger, gaseous discharge devices may be used inasmuch as the voltage protection portion of the protector is taken out of the fault circuit. When sufficient heat is transferred to the heat coil subassembly such as by a current fault, a fusible alloy melts to allow a spring to cause a heat coil flange to move and touch a laterally projecting tab of a ground terminal assembly. If a prolonged voltage surge occurs, there is an arcing over in the voltage surge limiter assembly, heat energy is transferred to a pin of the heat coil which engages a portion of the voltage surge limiter assembly, the fusible alloy is melted, and the spring moves the heat coil flange plate as before. However, the Heisinger protector module continues the use of a spring as part of the normal transmission and fault current circuits. At times, the presence of the spring in the voice frequency circuit may result in noise on the line. Also, because the spring moves slidably, insulating sleeves are disposed about the spring to prevent shorting.

A protector assembly having substantially lower elements and adapted to include either gas tubes or carbon blocks is disclosed in U.S. Pat. No. 4,458,288 which issued on July 3, 1984 in the names of J. L. Chapman, Jr. et. al. Each of two protector assemblies supported in a common housing includes a current protection subassembly which comprises a dielectric base and a line pin and a central office pin connected together electrically. A shunting element is disposed concentrically about the line pin and is secured to one end of the line pin in an initial position by a fusible material. A spring which is located between a cup of each voltage protection subassembly and the housing and which is not in the transmission circuit maintains the voltage protection subassembly in engagement with the shunting element. The spring is effective when current flow exceeds a predetermined level that is sufficient to melt the fusible material to cause the shunting element to be moved to a position where it engages a portion of a grounding subassembly to establish a fault current path to ground. For a prolonged voltage surge, heat energy is transferred from the voltage protection subassembly to the shunting element and melts the fusible material to allow the shunting element to be moved as in a current overload mode.

In a gas tube type protector, the electrodes typically are supported in an insulative sleeve housed in a metallic cup. The metallic cup is connected to ground. An end of one of the electrodes protrudes from the cup into engagement with the flanged portion of the sleeve positioned on the line pin. The level of the breakdown voltage is controlled by disposing a gas between the electrodes or by controlling the pressure of the air therebetween or by a combination of these measures.

In a narrow gap gas tube, the gap between electrodes is about 0.002 inch. Should the gas in the tube vent and there be an excessive voltage, the voltage will arc across the narrow gap and be conducted to ground. Such an arrangement offers protection in the 600 to 1200 volt range; however, a narrow gap gas tube is somewhat costly to manufacture.

Instead of a narrow gap gas tube, one with a wide gap, which is less costly to manufacture, may be used. In such a device, the gap is in the range of about 0.017 to 0.040 inch. If the gas vents, arcing across the wide gap will occur at a higher voltage, compromising the protection. It would be most desirable to have a fail-safe device with a high level of confidence for protection in the event the gas vents. Such a fail-safe device should be one which is incorporated easily into the above-described protector and which cooperates with other elements thereof to provide a path to ground in the event of an excessively high voltage.

Such fail-safe devices are not new in the art. For example, in one prior art arrangement, a washer which is made of a dielectric material is disposed externally of a gas tube to provide a secondary or auxiliary gap. However, the manner in which it is used and its cooperation with other elements seemingly does not lend itself well to manufacture. Also, in at least one patent which discloses a surge voltage arrester assembly, a first conductive member which engages a first electrode of the arrester is held in engagement with a metallic contact member. A solder pellet is supported between a cage and the second electrode of the surge arrester and a spring is interposed between the cage and a tubular housing member. Auxiliary gap protection is provided between the first conductive member and a second conductive member by an insulator disc having openings therein. The second conductive member is held in engagement with the insulator disc by fingers of the cage. In these kinds of arrangements, melting of the solder pellet allows the spring to move the cage downwardly causing disengagement of the fingers and the second conductive member. As a result, integrity of the auxiliary gap may be compromised. What is needed and what seemingly is not provided in the prior art is a wide gap gas tube protector having a secondary or auxiliary gap for excessively high voltage and being arranged so that the integrity of the auxiliary gap is maintained.

SUMMARY OF THE INVENTION

The foregoing problems have been overcome by the protector assembly of this invention which includes a dielectric housing for supporting the protector assembly and a grounding subassembly that is adapted to connect the assembly to ground when excessive voltage surges and excessive current increases appear in the circuit. A gas tube voltage protection subassembly is connected electrically to the grounding subassembly for conducting current associated with excessive voltage surges to ground. The protector assembly also includes a current protection subassembly having a dielectric base, first and second electrically conductive elements such as pins, for example, mounted in the base and a shunting element which are connected together to establish electrical contact between the circuit and the protector assembly. The shunting element is aligned axially with the first element and supported in spaced relationship thereto by a fusible material. A compression spring is interposed between the voltage protection subassembly in engagement with the shunting element. When the current flow increase above a predetermined level, the fusible material melts and the spring becomes effective to cause the shunting element to be moved along the first conductive element allowing a portion of the shunting element to engage the grounding subassembly and provide a current path from the first conductive element to ground.

The voltage protection subassembly includes a metallic container in the configuration of a cup having an open end and a closed end. Disposed inside the cup is a tubular insulator having a metallic cap of a first electrode secured to the annular rim at one end of the insulator and a cap of a second electrode secured to another end of the insulator and engaging the closed end of the cup. The electrodes are spaced apart to provide a relatively wide primary gap with a gas disposed therebetween. The first electrode is connected electrically to the shunting element by a portion which extends through an opening in a spacer which is held in the cup by turned-in portions of the cup. The spacer includes an auxiliary gap interposed between the first electrode of the gas tube and the turned-in portions of the cup.

The cup is formed in such a manner that its turned-in portions which engage the spacer are spring-loaded in a direction toward the closed end of the cup. As a result, the engagement between the spacer and the first electrode and between the spacer and the inwardly turned portions of the cup is such that the pressure between those elements is substantially constant.

In a normal operating mode, current flow is through a line pin, the first electrode, across the primary gap, then through the second electrode to the cup and thence to ground. Should the gas in the tube vent, a current path is established through the line pin and the first electrode, through the spacer, across the auxiliary gap in the spacer and through the cup to ground.

BRIEF DESCRIPTION OF THE DRAWINGS

Other features of the present invention will be more readily understood from the following detailed description of specific embodiments thereof when read in conjunction with accompanying drawings, in which.

DETAILED DESCRIPTION

Figures 1, 2:
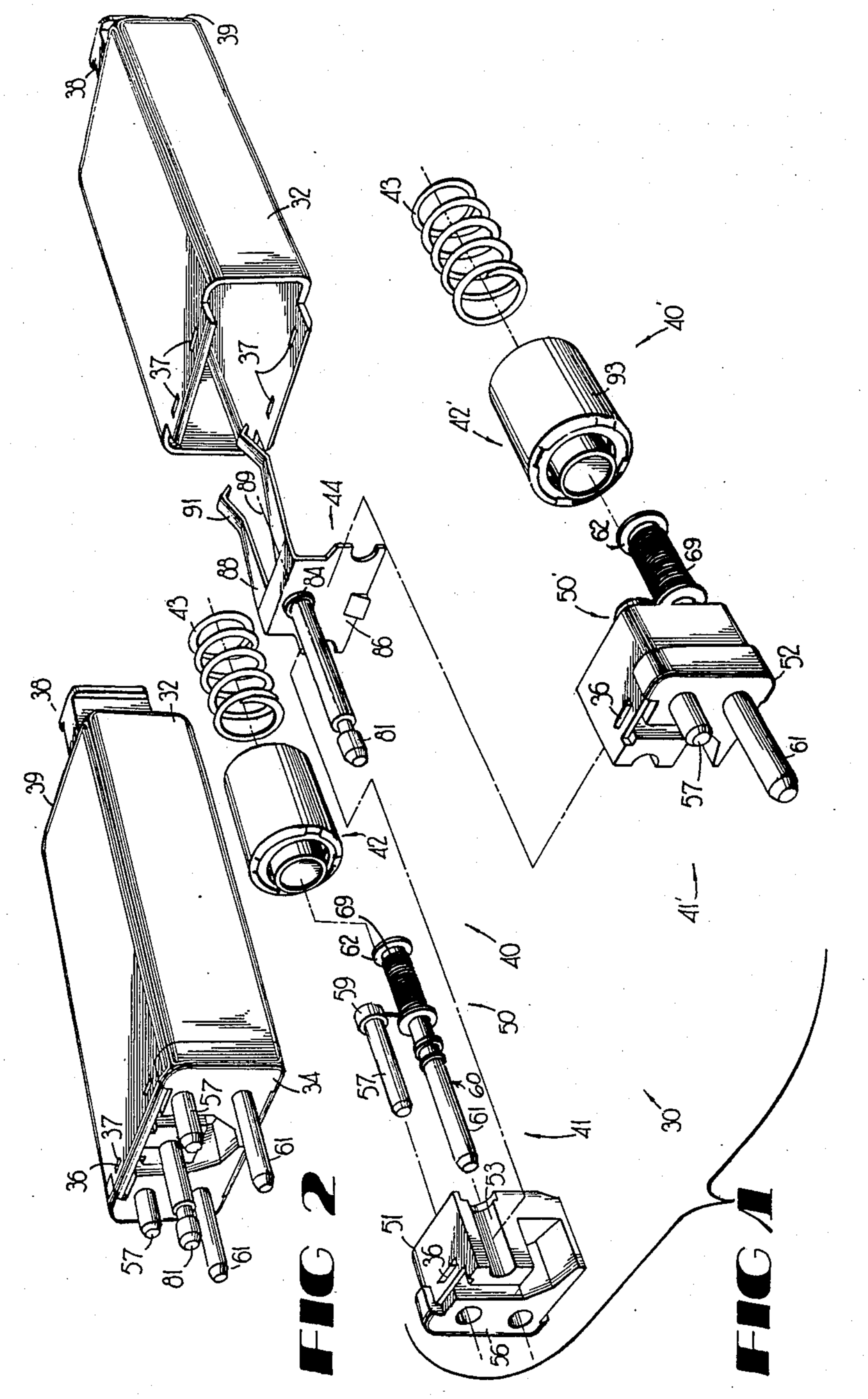
FIG. 1 is an exploded perspective view of a protector module which includes a pair of the electrical protector assemblies of this invention.
FIG. 2 is a perspective view of an assembled protector module of this invention.

Referring now to FIG. 1 there is shown a protector module which is designated generally by the numeral 30. A plurality of the protector modules may be mounted in a panel (not shown herein but see FIG. 1 of hereinbefore-identified J. L. Chapman et al U.S. Pat. No. 4,458,288 which is incorporated by reference hereinto) which has a plurality of sockets therein for receiving a plurality of pins projecting from the array of circuit protector modules. A plastic housing 32 is shown with a base subassembly 34 which is snap-fastened thereto by tangs 36-36 (see FIG. 2) on the base which are received in slots 37 37 in the housing. As can be seen in the drawings, a finger grip 38 is provided adjacent to a closed end 39 of the housing.

Figure 3:
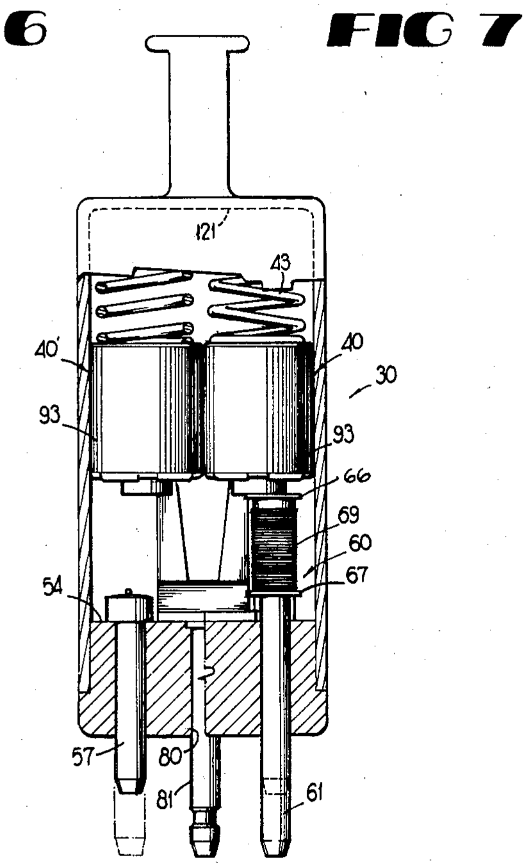
FIG. 3 is a front elevational view partially in section of the module of FIG. 2.

As can be seen in FIGS. 1 and 3, a pair of protector assemblies, designated generally by the numerals 40 and 40', are enclosed in the housing 32. One of the protector assemblies provides protection for a ring conductor and the other provides protection for a tip conductor of an associated telephone circuit (not shown). Except for base portions of each, the protector assemblies 40 and 40' are structurally identical to each other. Therefore, except for the base portions of each, the same numerals will be used for corresponding parts of the two protector assemblies with the general designation of subassemblies for one having a primod superscript.

Referring particularly to FIG. 1, it can be seen that the protector assembly 40 includes a current overload or protection subassembly which is designated generally by the numeral 41, a voltage protection subassembly which is designated generally by the numeral 42 and an energy storage means such as a compression spring 43. The voltage protection subassembly 42 is sometimes referred to as a voltage surge limiter subassembly. The protector module 30 also includes a grounding subassembly which is designated generally by the numeral 44 and which is common to both assemblies 40 and 40'.

The current protection subassembly 41 of the protector assembly 40 includes a current responsive portion 50 (see FIG. 1) which is generally referred to as a heat coil subassembly. The heat coil subassembly 50 is mounted in a right-hand base portion 51, as viewed in FIG. 3, and the heat coil subassembly 50' is mounted in a left-hand base portion 52. The left-hand and right-hand portions 51 and 52, which together comprise the base 34, are mirror images of each other and, in a preferred embodiment, each is made of a plastic insulating material such as polybutylene terephthalate (PBT). Each base half 51 and 52 (see FIG. 1) also includes a semi cylindrical passageway 53 formed from a surface 54 to a lower surface 56 thereof. This passageway 53 in one base half is designed to cooperate with the passageway in the other base half when the two are mated together to form the base subassembly 34.

Each portion of the base subassembly 34 supports first and second electrical contact elements which form part of the normal circuit current path. One of these is a central office pin 57 (see FIGS. 1 and 3) which is mounted in an interference fit in a bore in the base. A headed portion 59 of each central office pin 57 extends above the surface 54 of each base half.

Each heat coil subassembly includes a pin-eyelet subassembly 60 (see FIGS. 1 and 3). The input to each protector assembly 40-40' of the protector module 30 is through the pin eyelet subassembly 60. The pin-eyelet subassembly 60 includes a line pin 61 which is received in an interference fit in a bore (not shown) in the base half 51.

Figure 4:
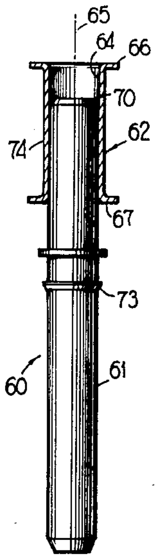
FIG. 4 is an elevational view partially in section of a pin-eyelet assembly.

The pin-eyelet subassembly 60 also includes an eyelet 62 having a longitudinal axis 65 (see FIG. 4). The cross-section of the eyelet in a plane normal to its longitudinal axis 65 is circular. Also, the eyelet 62 has the configuration of a sleeve or spool and includes a central passageway 64 and two flanges 66 and 67 (see FIGS. 3–4). The pin-eyelet assembly 60 is mounted in an interference fit in the bore of the heat coil base 51 such that the lower flange 67 of each eyelet 62 is spaced above the top surface of the base. The end of the eyelet which is adjacent to the voltage protection subassembly is closed by the flange 66. Also, the flange 66 prevents any jamming of the heat coil subassembly 50 between the voltage protection subassembly 42 and the housing 32.

A fusible material 70 (see FIG. 4), such as low temperature solder, for example, which has a predetermined melting point, is used to hold the eyelet 62 in a fixed position along the pin 61. In one embodiment, the fusible material is in the form of a solder pellet 63 (see FIG. 5) which is held in compressive engagement between a closed end of the eyelet 62 and an end surface of a tubular line pin 71 by the compression spring 43. Accordingly, in that embodiment, the eyelet 62 is supported in a first position at one end of the line pin 71 by means of the pellet 63 of solder.

The line pin 61 of the pin-eyelet subassembly 60 also includes barbs 73-73 which are spaced between the lower end of the line pin and the lower flange 67 of the eyelet. The barbs 73-73 of each line pin 61 are received in an interference fit within the base in order to cause the line pin to be able to resist forces which may be applied axially thereof. Such forces may be generated by plugging a protector module 30 into a central office panel.

The eyelet 62 is designed to hold a plurality of convolutions of a resistance wire 69 (see FIGS. 1 and 3) of the heat coil subassembly thereon. The wire 69 which is wound about the hub of the eyelet 62 is made from an alloy such as nichrome which in a preferred embodiment is covered with nylon insulation having a wall thickness of 0.008 cm. in the preferred embodiment, the wire 69 is such that its resistance between the line pin 61 and the central office pin 57 is not greater than 4 ohms. One end of the wire 69 is welded to a hub 74 of the eyelet adjacent to an end 76 and an unwound trailing end is welded to the head 59 of the central office pin 57 (see FIG. 2). The eyelet 62 is made of a metallic material since it is part of the loop circuit. The wire 69 is insulated since it is wound on the metallic hub 74 of the eyelet with its convolutions generally touching one another. Also, in the embodiment of FIG. 5, the convolutions of the wire 69 are concentrated along that portion of the sleeve which is adjacent to the pellet 63.

Because the end portion of the line pin 61 in the embodiment in which the pellet 63 of solder is used to support the sleeve is square to conform to the configuration of the sleeve 62, rotation of the sleeve on the line pin during winding of the wire 69 is inhibited. The line pin cannot rotate inasmuch as a portion of its length which has a square cross-section is received in a recess in the base 51 or 52 which has a square matching cross-section. In one embodiment, a pellet of fusible material engages not only an end of the line pin, but also engages a closed end of the sleeve which is engaged by a portion of the voltage protection subassembly. Any build up of heat is transferred efficiently into the fusible material rather than through a relatively long distance to a fusible bonding material as in some prior art devices.

A normal circuit path for the current is form the line pin 61 through the sleeve 62, through the wire 69 of the protector assembly 40 and out through the central office pin 57. When there is a current overload, the circuit through the line pin 61 into the metal eyelet 62 and through the wire 69 to the central office pin 57 causes the temperature of the wire to increase. The increased temperature is sufficient to cause the fusible alloy to melt and permit relative movement between the eyelet and the line pin.

Figure 5:
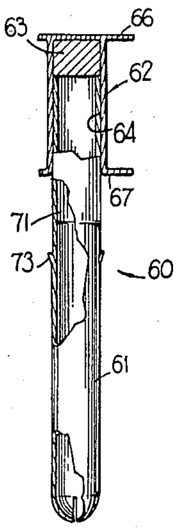
FIG. 5 is an elevational view partially in section of an alternate embodiment of a pin-eyelet assembly.

Inasmuch as in the one embodiment shown in FIG. 5, convolutions of the wire 69 are concentrated about the sleeve in the vicinity of the pellet 63, high current through the wire causes a rapid melting of the pellet of fusible material. Also, because the end of the tubular line pin 71 which is disposed within the sleeve 62 is open ended (see FIG. 5) with the pellet 63 being supported on the edge surface 68 thereof, the melted solder is allowed to flow into the pin to allow the sleeve to be moved along the pin by the associated compression spring 43.

Unlike some prior art protector assemblies, the line pin 61 of the protector assembly 40 of this invention for a conductor of each circuit forms a portion of the heat coil portion 50 of the current protection subassembly 41. Also, in the protector assembly shown in FIG. 3, the line pin 61 is aligned with the heat coil but is offset from the voltage protection subassembly 42.

When the base assemblies 51 and 52 are mated together to form the base 34, the semi cylindrical passageways 53-53 (see FIG. 1) are brought together in order to form a cylindrical passageway 80 (see FIG. 3) for receiving a ground pin 81 of the grounding subassembly 44. The grounding subassembly 44 is shown in FIG. 1 and includes the pin 81 having a shoulder 84 which is riveted to a ground plate 86 which is disposed along the top surface of the mated halves 51 and 52 of the base 34. When so disposed, portions of the ground plate 86 are received between the lower flange 67 of each one of the pin eyelet assemblies 60 60 and the top surface 54 of the base (see FIG. 3). The ground plate 86 of the grounding subassembly 44 is disposed between the central office pin 57 and the line pin 61 of each half of the base. The ground pin 81 of the grounding subassembly also includes a shoulder 87 (see FIG. 1). The shoulder 87 is adjacent to the surface 56 of the base 34 when the pin 81 is disposed within the passageway 80.

The grounding subassembly 44 also includes a bifurcated portion 88 which extends upwardly from the plate 86 and inwardly toward a centerline 89 of the ground pin 81. As such, each one of upwardly extending fingers or furcations 91-91 is spaced to one side of the centerline which extends through the ground pin.

The fingers 91-91 are configured to establish electrical contact with the voltage protection subassemblies 42-42′ of the module 30. Referring to FIG. 1, it can be seen that the free ends of the fingers 91-91 are shaped to bear against an inner surface of the housing 32 to insure electrical contact with the voltage protection subassemblies 42-42′. One finger 91 also engages a metallic cup 93 which houses the voltage protection subassembly 42 for the protection assembly 40 and the other finger 91 engages a cup 93 which houses the voltage protection subassembly for the protector assembly 40′.

The voltage protection subassembly 42 of the protector assembly 40 includes first and second electrodes 94 and 95, respectively (see FIGS. 6–7 and 8–9), which are assembled to a tubular ceramic insulator sleeve 96. The second electrode 95 includes a metallic cap 97 which is brazed to a peripheral end face 98 of the sleeve 96. At an opposite end of the assembly 40, the first electrode 94 includes a metallic cap 100 which is brazed to the other end of the ceramic sleeve. The cup 93 is positioned such that the lower, first electrode as viewed in FIG. 6 has a portion 101 thereof protruding therefrom to engage the upper flange 66 of an associated one of the pin eyelet subassemblies 60-60 (see FIG. 7). It should be observed from FIGS. 8-9 that an outer end of the first electrode portion 101 is annular to restrict the contact area with the flange 66 and to reduce the thermal conductivity from the heat coil.

The electrodes 94 and 95 are received in the cup 93 in a manner to space them apart through a predetermined gap 99 which is termed a primary gap. Typically, the gap 99 is filled with a gas such as argon to control the level of the breakdown voltage. The gap could be filled with air but at a pressure different from atmospheric to control the level of the breakdown voltage. The gap 99 in cooperation with the gas which fills the gap and its pressure are effective during a voltage protection mode of the protector to cause a sufficiently high voltage to bridge the gap and cause current to flow to ground. Also, the gap 99 is considered to be relatively wide and is on the order of about 0.017 to 0.040 inch.

Figure 6:
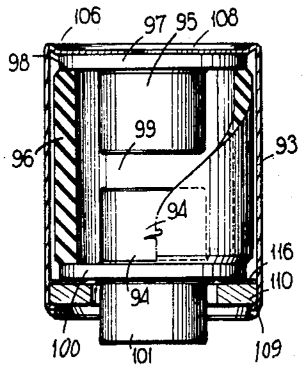
FIG. 6 is a front elevational view of a voltage protection subassembly of the module of FIG. 2 partially in section.
Figure 7:
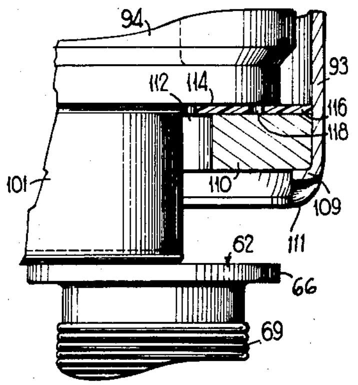
FIG. 7 is a detail view of a portion of the voltage protection subassembly of FIG. 6 and a portion of a sleeve of a heat coil subassembly.
Figure 8:
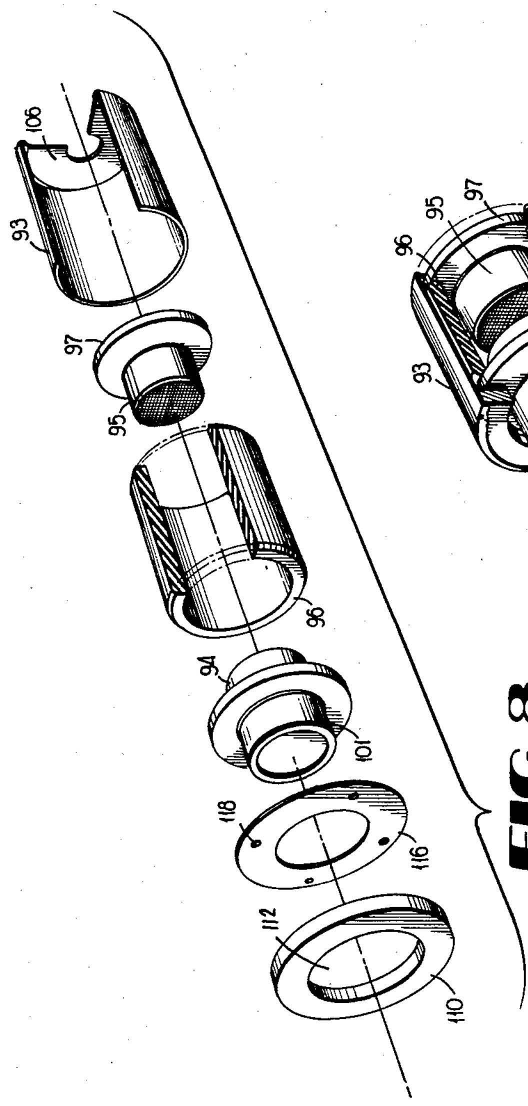
FIG. 8 is an exploded perspective view of the voltage protection subassembly of FIG. 6.
Figure 9:
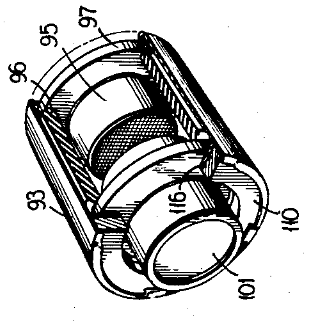
FIG. 9 is a perspective view of the voltage protection subassembly with a portion broken away.

It should be observed that the cup 93 includes a closed end 106 having a depressed portion 108 (see FIGS. 6 and 8). Portions 109-109 of the peripheral open end of the cylindrical side wall are formed with a flattened crimp and turned inwardly toward the longitudinal axis of the assembly 40. The portions may be spaced equidistantly about the circumference of the open end of the cup 93. Portions 111-111 (see FIG. 7) of the peripheral end of the cylindrical side wall between the portions 109-109 are roll-crimped and extend angularly downwardly.

Disposed in engagement with the turned in portions 109-109 is a metallic washer 110 (see FIGS. 6–7 and 8–9) having a central opening 112 through which the portion 101 of the first electrode extends. Between the washer 110 and an annular surface 114 of the first electrode 94 is a disc 116 which is made of a dielectric material and which includes a plurality of apertures 118-118. The disc 116 has a thickness which is about 0.0025 inch.

The disposition of the inwardly turned portions 109-109 of the cup 93 and the crimping of the closed end portion 106 are such as to cause the inwardly turned portions to exert spring forces in a direction toward the closed end 106 of the cup 93. As a result, the pressure between the washer 110 and the disc 116 and that between the disc 116 and the first electrode 94 is caused to be substantially constant. This contrasts to some commercially available devices in which the engagement of portions which form the auxiliary gap may change due to temperature cycling or because of melted solder pellets.

When a surge of excessive voltage is generated in a telephone line by a lightning strike, for example, the resulting potential appears across the protector module through the ring conductor protected by protector assembly 40, the tip conductor protected by the protector assembly 40′ or both conductors. Assuming that the potential enters through the ring conductor, it bridges the associated gap 99 between the first electrode 94 and the second electrode 95 of the protector assembly 40 and is conducted to a source of ground potential through the cup 93 and the grounding subassembly 44 (see FIG. 1). Should the gas between the electrode vent, because of broken bonds between the electrodes and the ceramic sleeve, for example, the current path is through the line pin into first electrode, through the apertures in the disc 116, into the washer 110, to the cup 93 and ground.

As can be seen in FIG. 3 of the drawings, an upper portion of each of the voltage protection subassemblies 42-42 is engaged by a compression spring 43 which also engages an inner portion 121 of the housing 32 of the protector unit. The spring 43 maintains the first electrode 94 in engagement with the eyelet 62. Also, the spring is adapted, upon melting of the fusible material, to cause the eyelet 62 to be moved from an initial, first position on the line pin 61 where it is supported along the line pin by the fusible material to a second position where a flange 67 of the eyelet engages the base plate 86 of the grounding subassembly 44.

Advantageously, each gas tube assembly includes a primary gap as well as a secondary gap integral therewith. The cup 93 is moved as a unit by the spring 43 when the solder melts. The washer 110 is held fixed relative to the electrode 93 so that the clearance between the first electrode 94 and the washer is maintained. Further, the engagement of the washer 110 and disc 116 and first electrode is maintained at a substantially constant pressure so that the gap is maintained substantially constant. The protector assembly of this invention, which includes a gas tube assembly having both a primary gap and a secondary gap, is easily assembled with the other elements to provide the protector assembly.

Figure 10:
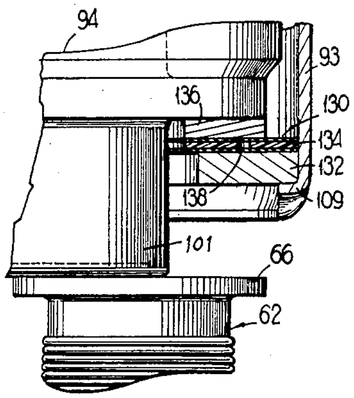
FIG. 10 is an enlarged elevational view partially in section of an alternative embodiment of an arrangement for providing an auxiliary gap.

Other arrangements for the auxiliary gap are within the scope of this invention. For example, as is shown in FIG. 10, a bonded spacer which is designated generally by the numeral 130 is interposed between the turned-in edge portions of the cup and the first electrode 94. The spacer assembly 130 includes a first metallic washer 132, an annular disc 134 which is made of a dielectric material and a second metallic washer 136 which are bonded together. The dielectric disc 134 is provided with a plurality of apertures 138-138 therethrough. The apertures are arranged about a circle intermediate inner and outer perpheries of the annular disc to provide an auxiliary gap having a predetermined thickness. In one example, the dielectric member may comprise a KAPTON® plastic material which is coated with a TEFLON® plastic material to cause it to adhere to the metallic members.

Figure 11:
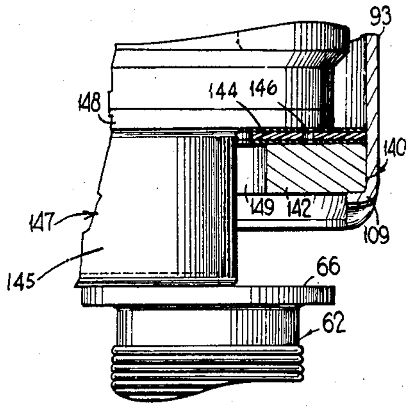
FIG. 11 is an enlarged elevational view partially in section of another embodiment for providing an auxiliary gap.

Another alternative embodiment is shown in FIG. 11. There, the first electrode 94 is formed without the protruding portion 101. A bonded assembly 140 is interposed between the turned-in portions of the cup 93 and the first electrode. The assembly includes a metallic washer 142 and an annular disc 144 which is made of a dielectric material and which has a plurality of apertures 146-146 arranged about a circle therein. Also, the assembly includes a metallic member 147 which includes a flange 148 that is in engagement with the disc 142 and the first electrode 94 and a projecting portion 145 which extends through an opening 149 in the washer 142. A free end of the protruding portion 145 engages the flange 66 of the sleeve 62.

The use of a spacer assembly offers at least one important advantage. Once the gas tube and spacer elements are assembled, it is difficult to test the operability of the auxiliary gap. When a voltage is applied, the arcing could occur through the primary gap. There is less resistance through the primary gap so the voltage most probably arcs across it. The only way to test the back-up or auxiliary gap is to vent the gas in the primary gap. Advantageously, the bonded spacer assembly is testable separate and apart from the gas tube assembly itself.

Figure 12:
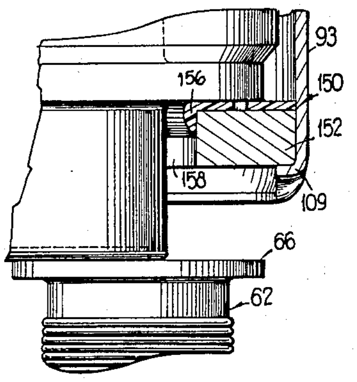
FIG. 12 is an enlarged elevational view partially in section of still another embodiment for providing an auxiliary gap.
Figure 13:
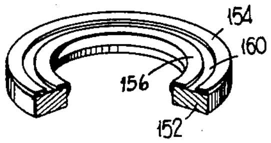
FIG. 13 is a perspective view of a portion of the embodiment of FIG. 12.

A still further alternative embodiment is shown in FIG. 12. There, a spacer designated 150 includes a metallic washer 152. Printed on the washer 152 is an annulus 154 and an annulus 156. The annulus 156 includes a portion which extends into an opening 158 of the washer. The annuli are comprised of a printed UV curable dielectric ink and cooperate to provide an auxiliary gap 160.

For the protector 30, it is significant that each line pin 61 comprises a portion of an associated heat coil subassembly 50 (see FIGS. 1 and 3) and is aligned vertically with the eyelet 62 thereof. The centerline of the line pin 61 and of the heat coil is offset slightly from the centerline of the voltage protection subassembly 42. Also, the line pin 61 and the eyelet 62 with the resistance wire 69 are made in one assembly thereby reducing the number of component parts for the protector assembly 40.

Another advantage of the protector assembly 40 of this invention is that the spring 43 is removed from both the normal transmission and fault current paths. It provides a force for urging the eyelet 62 into engagement with the ground plate 86 but is not in the normal current path or the fault current circuit. Because the spring 43 in the protector assembly 40 of this invention is not in the normal circuit path, insulating sleeves about the spring as is common in some prior art devices are not required.

In the operation of the protector module 30 of this invention, the wire 69, which has convolutions wound on the eyelet 62 of the pin eyelet assembly 60, functions as a resistance element with the heat being concentrated therein. In a normal operating mode, current flows in through the line pin 61, through the convolutions of the wire 69 wound on the eyelet 62 and out through the central office pin 57. Advantageously, all the connections between these parts which constitute the current path, are connected by welding with no pressure contacts nor soldering of the sleeve to the pin as in prior art protector assemblies.

In the event of excessive current, the current path is as before except that because the current exceeds that of the design load, the unit overheats from the energy generated by the excessive current. The wire 69 generates heat which is transferred to the eyelet 62 and which is sufficient to melt the fusible alloy material which supports the eyelet along the line pin. At that time, the spring 43 becomes effective to move the eyelet 62 from its first position where it is supported along the pin 61 by the fusible material toward the base to a second position where its flange 67 engages the plate 86 of the grounding subassembly (see FIG. 3). The lower flange 67 of the eyelet 62 functions as a shunting element. As a result, the current flows through the line pin 61, the eyelet 62 and directly to the ground plate, substantially shortening the current path from that of prior art protector assemblies.

In the event of a voltage overload, the current moves as before through the line pin 61, through the pin eyelet assembly 60 through the first electrode 94 of the voltage protector bridging the primary gap 99 to the second electrode 95 into the cup 93. There is a spark-over through the gas in the gap 99 between the electrodes 94 and 95 of the voltage protection subassembly. Current is conducted through the spring finger 91 to the ground plate 86 and out the ground pin 81 to the source of ground potential. Should for some reason the gas in the gap 99 vent, the current will flow into the first electrode 94, arc across the secondary or auxiliary gap into the washer and thence into the in-turned edge portions 109-109 of the cup 93 and to ground. In the event of a sustained voltage surge, sufficient heat is transferred from the electrode 94 to the eyelet to cause heat to be transferred through the flange 66 to melt the alloy which supports the eyelet along the line pin 61. At that time, as before with excess current occurrence, the eyelet 62 is caused to be moved along the pin 61 under the urging of the spring 43 to cause the flange 67 of the eyelet to engage the ground plate 86 and establish a shortened fault current path.

It should be understood that while the preferred embodiment of this invention includes two identical protector assemblies disposed within a single housing, the invention is not so limited. For example, and depending on the use to which the assembly is put, it could include a grounding subassembly, a heat coil subassembly and a voltage surge limiter subassembly disposed on one side of the grounding subassembly. The other side of the housing may support a dummy heat coil subassembly.

Further, the heat coil and/or voltage protection characteristics on one side of the module 30 need not be identical to those on the other side. The voltage protection can be changed by changing the gap 99 and the current protection can be changed by providing more or less resistance in the wound wire 69.

It is to be understood that the above-described arrangements are simply illustrative of the invention. Other arrangements may be devised by those skilled in the art which will embody the principles of the invention and fail within the spirit and scope thereof.

What is claimed is:

1. An electrical protector for protecting a circuit against excessive voltage surges, said protector including:

grounding means for grounding said protector when excessive voltage surges occur in the circuit;

conductive means for establishing electrical contact between the circuit and said protector;

a voltage protection subassembly which comprises first and second electrodes spaced apart through a relatively wide primary gap and disposed within a metallic container having a lateral portion extending between a closed end and an open end with the container being connected electrically to said grounding means and with said second electrode being in engagement with said closed end of said container and said first electrode being connected electrically to said conductive means; and energy storage means for maintaining said first electrode in electrical engagement with said conductive means; said protector being characterized in that said voltage protection subassembly includes spacer means disposed between said first electrode and the open end of said container for providing an electrical path including an auxiliary gap which is substantially less than the primary gap from said first electrode to portions of said container which are turned inwardly toward a centerline axis of said subassembly and which are biased toward said closed end of said container in a manner which causes said spacer means to be held in engagement with said first electrode at a substantially constant pressure.

2. The protector of claim 1, wherein said closed end of said container includes a central portion which engages said second electrode and which is depressed inwardly in a manner to cause end portions of the lateral portion of said container which are turned inwardly toward a centerline axis of said voltage protection subassembly to be biased toward said closed end of said container to engage an outwardly facing surface of said spacer means and to hold said spacer means in engagement with said first electrode at a substantially constant pressure therebetween.

3. The protector of claim 2, wherein said spacer means includes an annular dielectric member having at least one aperture therethrough and an annular metallic member which is in engagement with said container, said annular dielectric and metallic members having a substantially constant pressure therebetween.

4. The protector of claim 3, wherein said annular dielectric member is an annular disc- shaped member which is made of a dielectric material, which has a thickness which is substantially less than the distance between said first and second electrodes, and which has a plurality of apertures formed therethrough and aligned with said first electrode and said annular metallic member.

5. The protector of claim 4, wherein said open end of said container includes an opening through which a portion of said first electrode protrudes and defined by spaced lip portions which are engaged by said annular metallic member and with said annular dielectric member being disposed between said annular metallic member and said first electrode.

6. The protector of claim 3, wherein said annular metallic member is a first annular metallic member and said spacer means is an assembly including a second metallic member and said first annular metallic members each bonded to an annular dielectric member therebetween and wherein said first electrode is in engagement with said second annular metallic member which is interposed between said annular dielectric member and said first electrode.

7. The protector of claim 1, wherein said first electrode is spaced from retaining portions of said container by an auxiliary gap subassembly which comprises an annular first metallic member in engagement with said container, an annular dielectric member bonded to said first metallic member and a second metallic member comprising a flange which is in engagement with said first electrode and bonded to said annular dielectric member and a projecting portion which extends through openings in said annular first metallic member and said annular dielectric member.

8. The protector of claim 1, wherein a gas at a predetermined pressure is disposed in the primary gap.

9. An electrical protector assembly for protecting a circuit against excessive current increases and voltage surges, said protector assembly including:

a dielectric housing supporting the assembly;

a grounding subassembly for grounding said protector assembly when excessive voltage surges and excessive current increases occur in the circuit;

a voltage protection subassembly including a gas tube assembly which comprises first and second electrodes spaced apart through a relatively wide primary gap filled with a gas at a predetermined pressure and disposed within a metallic container having a closed end and an open end with the container being connected electrically to said grounding subassembly and with said second electrode being in engagement with said closed end of said container;

a current protection subassembly including a shunting element, first and second electrically conductive elements and a dielectric base for supporting said first and second electrically conductive elements which are connected to said shunting element to establish electrical contact between the circuit and said protector assembly, said shunting element being movably mounted and supported by a fusible material in a predetermined position along said first electrically conductive element in axial alignment therewith and in engagement with said voltage protection subassembly; and energy storage means interposed between said voltage protection subassembly and said housing and removed from a current path between said voltage protection and grounding subassemblies for maintaining said voltage protection subassembly in electrical engagement with said shunting element, and which is effective upon melting of the fusible material caused by the flow of current above a predetermined level for causing said shunting element to be moved along said first electrically conductive element from a first position to a second position to engage said grounding subassembly and provide a current path from said first element to said grounding subassembly; and characterized in that an annular metallic member and an annular dielectric member are interposed between said container and said first electrode, said dielectric member having at least one aperture therethrough to define an auxiliary gap which is substantially less than said primary gap, said annular metallic member being retained within said open end of said container by forces directed toward said closed end which cause the pressure between said annular metallic member and said annular dielectric member to be substantially constant, and said electrodes and said container being adapted to be moved by said energy storage means without relative movement therebetween when said fusible material is melted and said shunting element is moved along said first electrically conductive element.

10. The protector assembly of claim 9, wherein said annular dielectric member is an annular disc-shaped member which is made of a dielectric material and which has a thickness which is substantially less than the distance between said first and second electrodes, and which has a plurality of openings formed therethrough and aligned with said first electrode and said annular metallic member.

11. The protector assembly of claim 10, wherein said container includes an opening through said which a projecting portion of said first electrode protrudes and defined by lip portions which engage said annular metallic member and with said annular dielectric member being disposed between said annular metallic member and a portion of said first electrode from which said projecting portion extends.

12. The protector assembly of claim 9, wherein said annular metallic member is a first annular metallic member and said first electrode is in engagement with a second annular metallic member which is interposed between said annular dielectric member and said first electrode, said annular dielectric member being bonded to each of said annular metallic members.

13. The protector assembly of claim 9, wherein said closed end of said container includes a central portion which is depressed inwardly and which engages said second electrode and a lateral portion of said container having end portions directed inwardly toward a centerline axis of said voltage protection subassembly to define said open end and biased toward the closed end of the container to engage an outwardly facing surface of said annular metallic member to hold said annular metallic member in engagement at a substantially constant pressure with said annular dielectric member.

14. The protector assembly of claim 9, wherein said first electrode is spaced from retaining portions of said container, which are turned inwardly and biased toward said closed end, by an auxiliary gap bonded subassembly which comprises an annular first metallic member in engagement with said retaining portions, on annular dielectric member and a second metallic member comprising a flange in engagement with said first electrode and a projecting portion which extends through openings in said annular first metallic member and said annular dielectric member.

15. The protector assembly of claim 9, wherein said energy storage means is removed from a circuit between said first and second electrically conductive elements and from the current path from said first element to said grounding subassembly, and wherein an axis through said shunting element and said first conductive element is offset from an axis of said voltage protection subassembly.

16. The protector assembly of claim 9, wherein said current protection subassembly comprises a dielectric base adapted to be secured to said housing, first and second electrically conductive pins supported in said base and extending therethrough, a sleeve which has electrically conductive flanged end portions and which is disposed concentrically about an end portion of said first pin and supported in an initial position therealong by a fusible material and a wire having predetermined resistance characteristics which is wound about an outer surface of said sleeve with one end being connected electrically to an end portion of said sleeve and with its other end being secured to said second pin to establish a current path from said first pin through said sleeve and said wire to said second pin; and wherein said grounding subassembly is connected electrically to said second electrode to provide a current path from said first pin through said first electrode across said primary gap to said second electrode and to ground during a voltage surge which is sufficient to cause the current to bridge said gap.

17. The electrical protector assembly of claim 16, wherein the circuit to be protected includes a tip conductor and a ring conductor with one said current protection subassembly, one said voltage protection subassembly, one said compression spring and a portion of said grounding subassembly being associated with each of the tip and the ring conductors, said first pin of each said current protection subassembly being a line pin and said second pin being a central office pin, and wherein said current protection subassembly, said voltage protection subassembly, and said compression spring associated with each of the tip and ring conductors of the circuit and said grounding subassembly are mounted in said housing, said electrodes of each said voltage protection subassembly being spaced apart and positioned along a common axis, each common axis being spaced from a centerline axis of said protector assembly, and each common axis being offset from an axis which extends through said first pin and said sleeve.

18. The assembly of claim 9, wherein said shunting element comprises a sleeve and wherein said grounding subassembly includes:

a ground plate which is disposed between inner ends of said first and second conductive elements, which is disposed adjacent to said base, and which is adapted to be engaged by one end of said sleeve when said sleeve is moved to its second position;

a pin having an end secured to said ground plate and extending through said base; and a bifurcated portion connected to said ground plate and extending laterally thereof, said portion having furcations each of which includes a free end that engages said metallic container which supports the electrodes of one of said voltage protection subassemblies.

19. A gas tube assembly, said gas tube assembly including;

a metallic container having a closed end and an open end, said open end having inwardly directed side portions;

an insulative sleeve disposed within said metallic container;

first and second electrodes with said second electrode being attached to one end of said sleeve and being in engagement with said closed end of said container, and with said first electrode being attached to another end of said sleeve, said first and second electrodes being spaced apart within said sleeve through a relatively wide primary gap; and characterized in that said assembly includes spacer means for spacing said first electrode from said inwardly directed side portions at said open end, said spacer means including an annular metallic member which is in engagement with said inwardly directed side portions and an annular dielectric member which is interposed between said annular metallic member and said first electrode, said annular dielectric member having at least one aperture therein which is confronted by said annular metallic member and which has a thickness predetermined to provide a desired auxiliary gap, said closed end of said container being formed with a depressed portion to cause said inwardly turned side portions to be biased toward said closed end to cause said spacer means to be in engagement with said first electrode and with said inwardly turned portions at a substantially constant pressure.

20. The gas tube assembly of claim 19, wherein a portion of said first electrode protrudes through openings in said annular metallic and dielectric members and toward said open end of said container.

21. The gas tube assembly of claim 19, wherein said spacer means is a bonded assembly which includes a first annular metallic member which is in engagement with said inwardly directed side portions of said container, a second annular metallic member which is in engagement with said first electrode and a dielectric material which is disposed between said first and second annular metallic members and bonded thereto in a manner which provides an auxiliary gap, said second annular metallic member including a portion which extends through openings in said annular dielectric and first metallic members.

* * * * *